(12) United States Patent
Gashi et al.

(10) Patent No.: US 11,067,088 B2
(45) Date of Patent: Jul. 20, 2021

(54) HEATING, VENTILATION AND AIR CONDITIONING SYSTEM COMPRISING A FLUID COMPRESSOR

(71) Applicant: Belenos Clean Power Holding AG, Biel/Bienne (CH)

(72) Inventors: Rexhep Gashi, Givisiez (CH); Lucie Meyrat, Tramelan (CH)

(73) Assignee: Belenos Clean Power Holding AG, Biel/Bienne (CH)

( * ) Notice: Subject to any disclaimer, the term of this patent is extended or adjusted under 35 U.S.C. 154(b) by 24 days.

(21) Appl. No.: 16/364,919

(22) Filed: Mar. 26, 2019

(65) Prior Publication Data
US 2019/0323511 A1    Oct. 24, 2019

(30) Foreign Application Priority Data

Apr. 20, 2018 (EP) .................................... 18168589

(51) Int. Cl.
*F04D 25/06* (2006.01)
*B60H 1/32* (2006.01)
(Continued)

(52) U.S. Cl.
CPC ........... *F04D 25/06* (2013.01); *B60H 1/3223* (2013.01); *F04D 29/5806* (2013.01);
(Continued)

(58) Field of Classification Search
CPC .... F04D 25/082; F04D 25/06; F04D 29/5806; F04D 29/5813; F04D 25/0606;
(Continued)

(56) References Cited

U.S. PATENT DOCUMENTS 2,114,670 A * 4/1938 Searles ................. F16C 27/066
384/536
4,167,295 A * 9/1979 Glaser ................... F16C 17/042
384/105
(Continued)

FOREIGN PATENT DOCUMENTS

CH              710 120 A1       3/2016
CN           103016364 A         4/2013
(Continued)

OTHER PUBLICATIONS

European Search Report dated Oct. 1, 2018 in European Application 18168589.2, filed on Apr. 20, 2018.
(Continued)

*Primary Examiner* — Devon C Kramer
*Assistant Examiner* — Thomas Fink
(74) *Attorney, Agent, or Firm* — Oblon, McClelland, Maier & Neustadt, L.L.P.

(57) ABSTRACT

A heating, ventilation and air conditioning system including a two-stage, high speed fluid compressor including a case having a fluid inlet and a compressed fluid outlet and containing a shaft rotatably mounted about a longitudinal axis, a first compression wheel and a second compression wheel mounted back-to-back on the shaft, the first compression wheel forming a first compression stage and the second compression wheel forming a second compression stage, and a motor positioned between the first compression wheel and the second compression wheel and arranged to rotate the shaft. The case includes a through inner housing inside which is arranged at least the motor, the inner housing having an internal wall arranged to form, with the motor, channels between at least the inner wall and the motor, the channels allowing the motor to be cooled on contact with fluid.

16 Claims, 6 Drawing Sheets

(51) Int. Cl.
*F04D 29/58* (2006.01)
*F04D 17/12* (2006.01)
*F04D 29/057* (2006.01)
*F04D 29/051* (2006.01)

(52) U.S. Cl.
CPC .......... *F04D 17/122* (2013.01); *F04D 29/057* (2013.01); *F04D 29/0513* (2013.01)

(58) Field of Classification Search
CPC ........ F04D 1/08; F04D 17/122; F04D 17/125; F16C 17/026; F16C 17/045
See application file for complete search history.

(56) References Cited

U.S. PATENT DOCUMENTS

| | | | | |
|---|---|---|---|---|
| 4,366,993 | A * | 1/1983 | Ono | F16C 32/0622 384/120 |
| 5,350,039 | A | 9/1994 | Voss et al. | |
| 5,555,956 | A | 9/1996 | Voss et al. | |
| 6,155,802 | A * | 12/2000 | Choi | F02C 6/12 417/366 |
| 6,375,438 | B1 | 4/2002 | Seo | |
| 6,481,917 | B1 | 11/2002 | Chen et al. | |
| 7,013,669 | B2 * | 3/2006 | Ophir | F04D 17/12 417/247 |
| 7,753,646 | B1 * | 7/2010 | Keck | H02K 9/08 415/112 |
| 8,118,564 | B2 * | 2/2012 | Enami | F04C 18/3564 417/44.1 |
| 8,347,645 | B1 * | 1/2013 | Miller | B60H 1/00428 62/236 |
| 8,777,591 | B2 * | 7/2014 | Cho | F04C 18/0215 417/366 |
| 10,069,154 | B2 * | 9/2018 | Metz | F04D 25/0606 |
| 2003/0174911 | A1 * | 9/2003 | Oe | F16C 17/107 384/107 |
| 2003/0200761 | A1 * | 10/2003 | Funahashi | F04B 35/04 62/228.4 |
| 2004/0005228 | A1 * | 1/2004 | Agrawal | F04D 29/053 417/365 |
| 2004/0013544 | A1 | 1/2004 | Kimura et al. | |
| 2004/0179947 | A1 * | 9/2004 | Agrawal | F04D 29/624 417/212 |
| 2006/0150668 | A1 * | 7/2006 | Ro | F25B 1/053 62/510 |
| 2007/0065276 | A1 * | 3/2007 | Muller | F04D 29/083 415/170.1 |
| 2009/0087299 | A1 * | 4/2009 | Agrawal | F04D 29/057 415/1 |
| 2009/0257895 | A1 * | 10/2009 | Takado | F04D 29/0516 417/423.12 |
| 2010/0079958 | A1 * | 4/2010 | Kaehs | H01L 23/4006 361/717 |
| 2010/0239437 | A1 * | 9/2010 | Maier | F04D 17/122 417/245 |
| 2010/0287958 | A1 * | 11/2010 | Telakowski | F04D 29/5806 62/56 |
| 2011/0097222 | A1 * | 4/2011 | Komatsu | F04D 29/5826 417/366 |
| 2011/0243762 | A1 * | 10/2011 | Daikoku | F16C 37/002 417/321 |
| 2011/0255963 | A1 * | 10/2011 | Kim | F04D 29/0516 415/211.2 |
| 2012/0017617 | A1 * | 1/2012 | Beers | F04D 29/584 62/118 |
| 2016/0052365 | A1 * | 2/2016 | Kohigashi | B60H 1/00921 165/202 |
| 2017/0328269 | A1 * | 11/2017 | Yamashita | F01P 7/14 |
| 2018/0135633 | A1 * | 5/2018 | Mayleben | G01F 23/268 |
| 2019/0048893 | A1 * | 2/2019 | Kim | F04D 17/12 |

FOREIGN PATENT DOCUMENTS

| | | |
|---|---|---|
| DE | 10 2014 113 412 B3 | 9/2015 |
| JP | 2002-539377 A | 11/2002 |
| JP | 2003-324903 A | 11/2003 |
| JP | 2004-100683 A | 4/2004 |
| JP | 2005-83506 A | 3/2005 |
| JP | 2009-203902 A | 9/2009 |
| JP | 2010-203617 A | 9/2010 |
| JP | 2012-26436 A | 2/2012 |
| WO | WO 2017/10561 A1 | 6/2017 |
| WO | WO 2017/105615 A1 | 6/2017 |

OTHER PUBLICATIONS

Grounds for Final Rejection dated Oct. 16, 2020 in corresponding Korean Patent Application No. 10-2019-0044961 (with English Translation) (6 pages).

Notice of the Reason for Refusal dated Mar. 31, 2020 in corresponding Japanese Patent Application No. 2019-054234 (with English Translation) (14 pages).

Notice of the Reason for Refusal dated Oct. 6, 2020 in corresponding Japanese Patent Application No. 2019-054234 (with English Translation) (14 pages).

Notice of the Reason for Refusal dated Apr. 13, 2021 in corresponding Japanese Patent Application No. 2019-054234 (with English translation)(13 pages)

European Search Report dated Oct. 1, 2018 in European Application 18168589.2, filed on Apr. 20, 2018 (with English Translation of Categories of Cited Documents).

* cited by examiner

HEATING, VENTILATION AND AIR CONDITIONING SYSTEM COMPRISING A FLUID COMPRESSOR

CROSS-REFERENCE TO RELATED APPLICATION

This application claims priority to European Patent Application No. 18168589.2 filed on Apr. 20, 2018, the entire disclosure of which is hereby incorporated herein by reference.

FIELD OF THE INVENTION

The present invention relates to a heating, ventilation and air conditioning system (HVAC), i.e a system implementing at least one function among a heating function, a ventilation function and an air conditioning function, comprising a two-stage, high-speed fluid compressor comprising a case having a fluid inlet and a compressed fluid outlet and containing a shaft rotatably mounted about a longitudinal axis, a first compression wheel and a second compression wheel mounted back-to-back on said shaft, said first compression wheel forming a first compression stage and said second compression wheel forming a second compression stage, and a motor, preferably a synchronous electric motor, positioned between the first compression wheel and the second compression wheel and arranged to rotate the shaft.

The present invention also concerns a vehicle including such an HVAC system.

BACKGROUND OF THE INVENTION

Such fluid compressors are generally called turbo compressors or centrifugal compressors. They are provided with a stator and a rotor forming a permanent magnet synchronous motor (brushless motor). Compressors of this type can reach very high speeds, for example from 100,000 to 500,000 revolutions per minute. The motor drives the compression wheels at high speed, and the compression wheels compress the fluid. The fluid used here is a refrigerant, particularly a refrigerant gas. The use of two compression wheels allows the fluid to be compressed twice as much.

These HVAC (heating, ventilation and air conditioning) systems can be used, in particular in electric, hybrid or hydrogen vehicles.

These compressors generally include a first circuit for flow of a fluid to be compressed and a second circuit for flow of a cooling liquid used to cool the compressor, and more particularly the motor and the bearings supporting the motor shaft on the one hand, and the electronic components on the other. Indeed, the high speed rotation of the motor causes very high heating, such that the compressor elements must be cooled to avoid damage. These circuits are generally arranged outside the actual compressor, at least as far as the cooling circuit is concerned.

Consequently, these compressors are very bulky and cannot be integrated in a limited environment, such as a vehicle.

Further, the heat recovered by the cooling liquid is wasted, which constitutes a considerable waste of energy.

SUMMARY OF THE INVENTION

It is an object of the invention to overcome the various drawbacks of known HVAC systems comprising a high-speed compressor.

More precisely, it is an object of the invention to provide an HVAC system including a very compact, two-stage, high-speed fluid compressor.

It is another object of the invention to provide a HVAC system including a two-stage, high-speed fluid compressor having a high rotational speed, a high compression ratio and optimum energy efficiency, yet which occupies a small volume, such as a vehicle.

To this end, the present invention concerns a heating, ventilation and air conditioning (HVAC) system including a two-stage, high speed fluid compressor comprising a case having a fluid inlet and a compressed fluid outlet and containing a shaft rotatably mounted about a longitudinal axis, a first compression wheel and a second compression wheel mounted back-to-back on said shaft, said first compression wheel forming a first compression stage and said second compression wheel forming a second compression stage, and a motor positioned between the first compression wheel and the second compression wheel and arranged to rotate the shaft.

According to the invention, the case includes an inner through housing extending coaxially to the longitudinal axis and inside which is arranged at least the motor, said inner housing having an inner wall arranged to form, with the motor, channels between at least said inner wall and the motor, said channels extending between the first compression stage and the second compression stage, to cool the motor in contact with the fluid to be compressed flowing in the channels. Further, the case includes at its surface at least one cavity forming at least one integrated housing arranged to receive at least one electronic component of the compressor, said integrated housing extending towards the inner wall to allow said electronic component to be cooled by the fluid to be compressed flowing in the channels via the inner wall.

Thus, the HVAC system according to the invention includes a compressor which uses one and the same fluid both for compression and for cooling the compressor. The arrangement of channels used both for circulating fluid to be compressed and for cooling the various compressor elements makes it possible to obtain a very compact compressor and therefore HVAC system. In particular, the configuration with the electronic component cooled via the inner wall has several advantages compared to a configuration wherein the electronic component is cooled directly by the fluid. All the electronic components can be arranged without special sealing. It is possible to carry out work on the electronic components without draining the fluid, which is a complicated and expensive operation. Further, securing the electronic component inside the integrated housing in the case saves space.

Moreover, the HVAC system according to the invention includes a compressor that can recover all heat losses in the motor, in the bearings supporting the motor shaft and in the electronic components, to transform said losses into useful work. Thus, the HVAC system according to the invention includes a compressor which has a high rotational speed, a high compression ratio and optimum energy efficiency, yet which occupies a small volume.

BRIEF DESCRIPTION OF THE DRAWINGS

The objects, advantages and features of the present invention will appear more clearly in the following detailed description of an embodiment of the invention, given solely by way of non-limiting example and illustrated by the annexed drawings, in which.

DETAILED DESCRIPTION OF THE INVENTION

Figure 1:
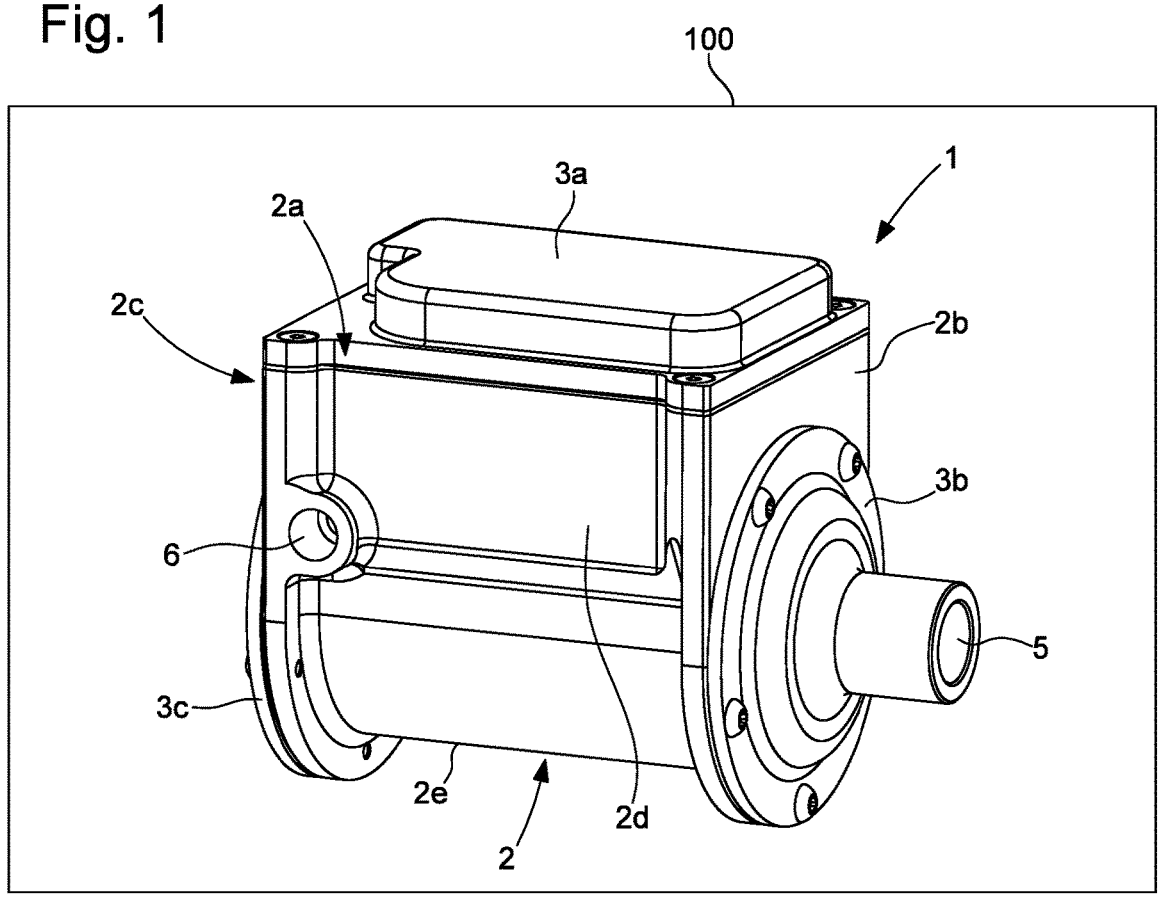
FIG. 1 represents a schematic view of a HVAC system according to the invention comprising a high-speed compressor, seen in perspective.

Referring to FIG. 1, there is schematically represented an HVAC system 100 according to the invention comprising a two-stage, high-speed fluid compressor 1, of the turbo compressor or centrifugal compressor type. In the following description, the term 'fluid' refers to a refrigerant, and mores specifically a refrigerant gas. With the exception of the compressor described below, the elements composing the HVAC system are known and do not require any particular description here.

Compressor 1 includes a case 2, made of aluminium, whose upper face 2a is closed by an upper cover 3a and whose front face 2b and back face 2c are respectively closed by a front cover 3b and a back cover 3c. The lateral faces 2d of the case are joined at their base to form a bottom 2e having a U-shaped cross-section.

Upper cover 3a is positioned on the side of the electronic components 4 of the compressor, as will be seen hereinafter. Thus, access to electronic components 4 integrated in the compressor is easy, as will be seen hereinafter, since access occurs through upper cover 3a. The front and back covers 3b, 3c are used to access the interior of the compressor (motor, rotor, bearings, etc.). A sealing gasket 20 is inserted between upper face 2a of case 2 and upper cover 3a. This gasket 20 protects electronic components 4 from dust and moisture.

Case 2 has an inlet 5 for fluid to be compressed arranged on front cover 3b and a tangential compressed fluid outlet 6 arranged on one of lateral faces 2d of case 2.

Figure 4:
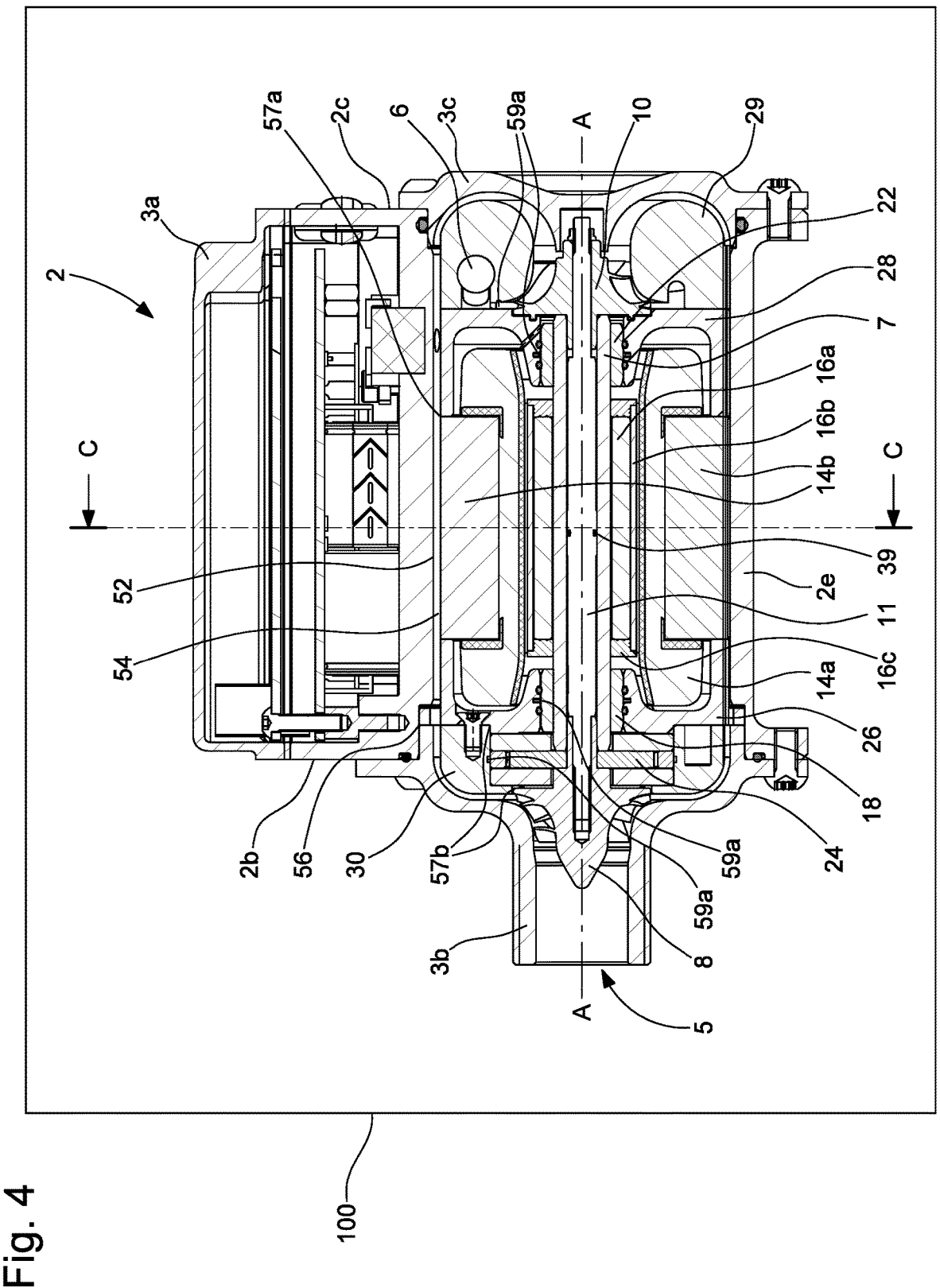
FIG. 4 is a longitudinal sectional view of the compressor of FIG. 1.

Referring to FIG. 4, case 2 contains a ceramic shaft 7, rotatably mounted about a longitudinal axis AA passing through front and back faces 2b and 2c, a first centrifugal compression wheel 8 and a second centrifugal compression wheel 10 mounted back-to-back at each end of shaft 7, said first compression wheel 8 forming a first compression stage and said second compression wheel 10 forming a second compression stage. More particularly, shaft 7 is hollow and contains a threaded rod 11, at each end of which is screwed one of compression wheels 8, 10, which allows for easy assembly and disassembly of the compression wheels. Thus, the two compression wheels 8 and 10 are driven on the same shaft 7, which provides better energy efficiency and avoids using a reduction gear. The back of compression wheels 8 and 10 includes a labyrinth seal to control the pressures inside the compressor and to balance axial forces.

Case 2 also contains a synchronous electric motor 12 positioned between first compression wheel 8 and second compression wheel 10 and arranged to rotate shaft 7. Motor 12 includes a stator 14 and a rotor which interact to form a permanent magnet synchronous electric motor (brushless motor). More particularly, stator 14 is formed by a coil 14a and two ferrite elements 14b, fixedly mounted with respect to case 2. The rotor includes a magnet 16a made integral with shaft 7, for example by adhesive bonding, and is covered with a carbon fibre sheath 16b. Titanium flanges 16c are fixed (for example by adhesive bonding) to the lateral ends and ensure resistance of the rotor to centrifugal forces at high speeds.

Shaft 7 is rotatably mounted on case 2 about its longitudinal axis AA by means of at least a front radial bearing 18, a back radial bearing 22 and an axial bearing 24. The compressor includes a front radial bearing bracket 26 for supporting front radial bearing 18, a back radial bearing bracket 28 for supporting back radial bearing 22, arranged to be positioned around shaft 7, respectively at the front and at the back of motor 16. At the back, there is also provided a volute 29 between back radial bearing bracket 28 and back cover 3c. Volute 29 includes the orifice leading to tangential fluid outlet 6, after compression. There is also provided an axial bearing bracket 30 for supporting axial bearing 24, arranged to be positioned around shaft 7, between first compression wheel 8 and front radial bearing bracket 26. it is clear that the axial bearing could be arranged at the back of the motor.

Figure 6:
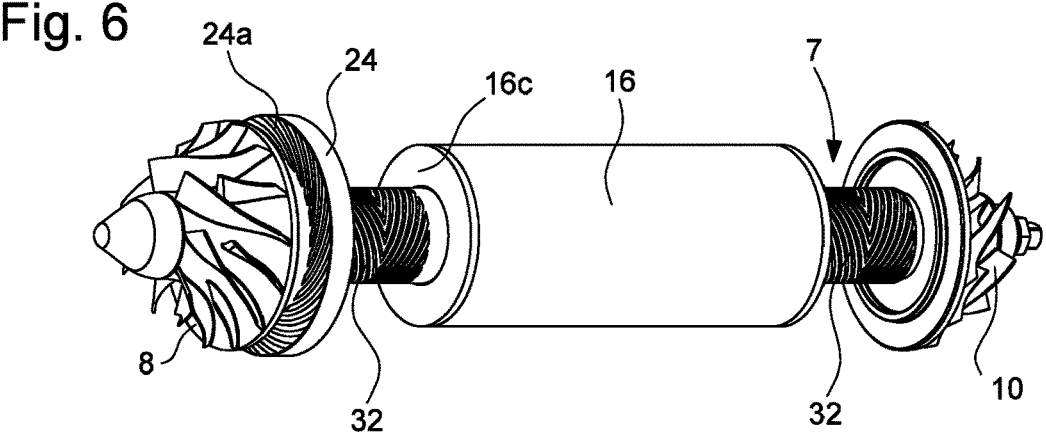
FIG. 6 is a perspective view of the shaft carrying the compression wheels and the rotor.

The bearings are contactless and aerodynamic in order to produce limited friction. They do not require lubrication and need very little maintenance. More particularly, with reference to FIG. 6, axial bearing 24 is an aerodynamic bearing and is formed by a disc that comprises, on at least one of its faces, first, preferably spiral-shaped grooves 24a, arranged to create an air film. Front and back radial bearings 22 are aerodynamic bearings, and, facing front and back radial bearings 18 and 22, shaft 7 has second grooves 32 arranged to create an air film.

Figure 7:
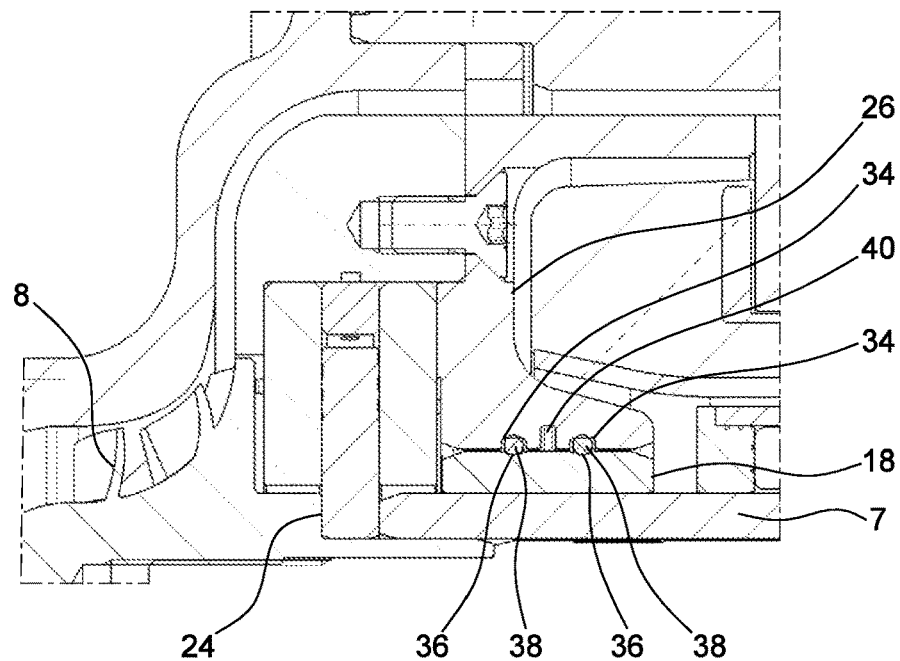
FIG. 7 is an enlarged sectional view of the compressor around the bearings.

Referring to FIG. 7, the front radial bearing bracket 26 includes at least a first slot 34 positioned facing a second slot 36 provided on the front radial bearing 18, said first slot 34 and said second slot 36 being arranged to receive a front bearing O-ring joint 38. In FIG. 7, two sets of slots 34, 36 are provided. Likewise, back radial bearing bracket 28 includes at least a third slot positioned facing a fourth slot provided on back radial bearing 22, said third slot and said fourth slot being arranged to receive a back bearing O-ring joint. The slots provided on front radial bearing 18 and on back radial bearing 22 have a rounded bottom. Radial bearings 18, 22 are held axially and radially only by said respective O-ring joints. The latter ensure the centring of radial bearings 19, 22, compensate for radial play, dampen vibrations and maintain their axial position. Further, this assembly saves space, further increasing the compactness of the compressor.

The radial holding and centring of threaded rod 11 bearing the two compression wheels 8 and 10 at the centre of shaft 7 are achieved by means of a joint 39 (cf. FIG. 4) mounted in a slot provided on threaded rod 11.

Further, front radial bearing bracket 26 includes a fifth slot 40 provided for the passage of air. Likewise, back radial bearing bracket 28 includes a sixth slot provided for the passage of air. These fifth and sixth slots, and the bores communicating between each important point of the bearings, make it possible to balance pressure throughout the compressor and especially between the sealing joints. This avoids dislodging the joints.

Figure 2:
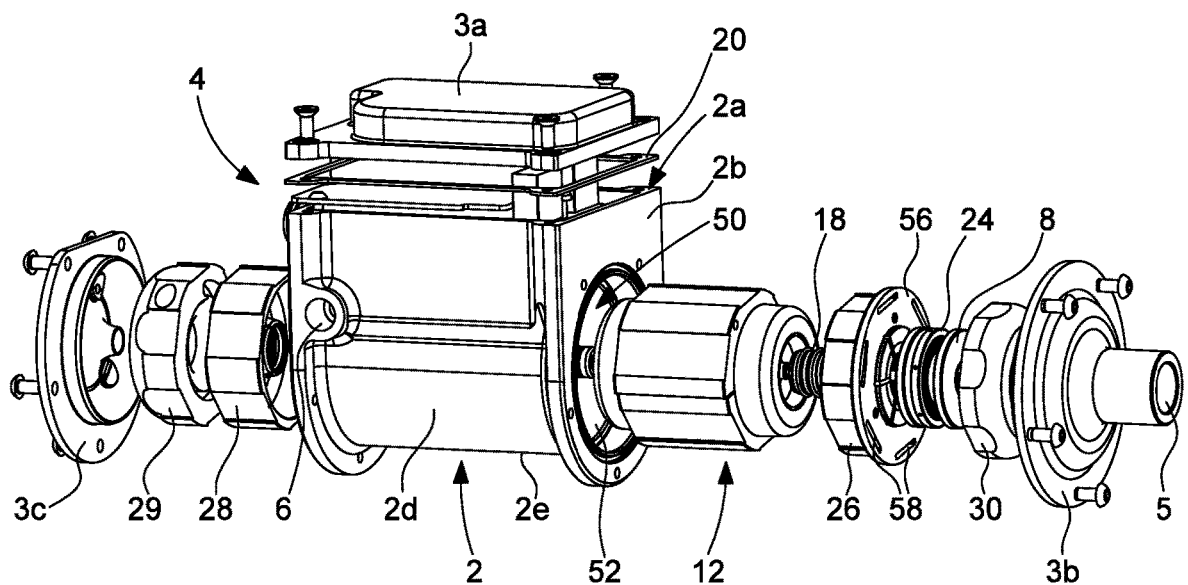
FIG. 2 represents an exploded view of the compressor of FIG. 1 along the longitudinal axis.
Figure 5:
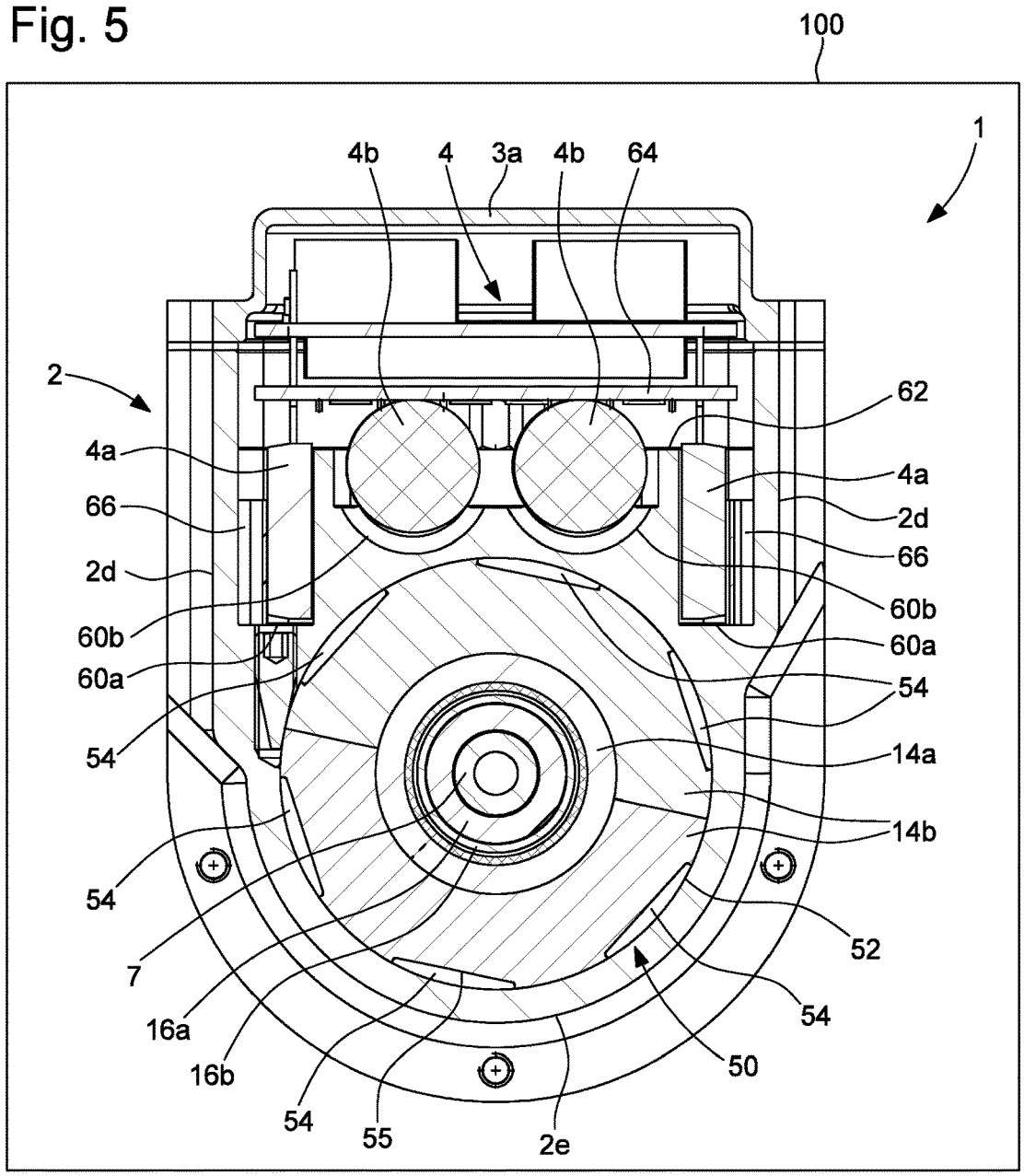
FIG. 5 is a sectional view along line C-C of FIG. 4.

Referring to FIGS. 2, 4 and 5, case 2 includes a through inner housing 50 extending coaxially to longitudinal axis AA between front face 2b and back face 2c of case 2 and receiving front radial bearing bracket 26 and front radial bearing 18, motor 12 and its shaft 7, back radial bearing bracket 28 and back radial bearing 22, second compression wheel 10 and volute 29. On the side of front face 2b, inner housing 50 is closed by front cover 3b which incorporates first compression wheel 8, axial bearing bracket 30 and axial bearing 24. On the side of back face 2c, inner housing 50 is closed by back cover 3c.

Inner housing 50 has an inner wall 52 arranged to form, with motor 12, channels 54 between at least said inner wall 52 and motor 12, said channels 54 extending between the first compression stage and the second compression stage, allowing motor 12 to be cooled on contact with fluid to be compressed flowing in channels 54. More specifically, in the variant represented here, inner wall 52 of inner housing 50 has a circular cross-section and the two ferrite elements 14b of stator 14 of motor 12 have, on their external faces, longitudinal hollows 55 (cf. FIG. 5), extending along longitudinal axis AA, giving the motor a substantially polygonal cross-section (dodecagonal here) such that hollows 55, or the faces of ferrite elements 14b of motor 12 that are not in contact with inner wall 52, form with said inner wall 52 said channels 54 for flow of fluid to be compressed.

More generally, all the parts of the compressor located along the longitudinal access between the first compression stage and the second compression stage are sized and arranged to form said flow channels 54 for fluid to be compressed, extending between the first compression stage and the second compression stage. Thus, channels 54 are formed between front cover 3b and axial bearing bracket 30, between front radial bearing bracket 26 and inner wall 52 (to this end, shoulder 56 of front radial bearing bracket 26 which rests on the inlet of housing 50 has slots 58, arranged in correspondence with compression fluid flow channels 54), between ferrite elements 14b of motor 12 and inner wall 52, as described above, between back radial bearing bracket 28 and inner wall 52, between volute 29 and inner wall 52 and between back cover 3c and volute 29. These channels 54 are designed to avoid turbulence inside the compressor.

Further, there is advantageously provided at least one orifice (for example the point referenced 57a in FIG. 4) arranged to allow fluid to be compressed flowing inside channels 54 to enter motor 12 and flow between stator 14 and rotor 16; and at least one orifice (for example the point referenced 57b in FIG. 4) arranged to allow fluid to be compressed to exit motor 12 and rejoin said channels 54 after cooling motor 12.

Likewise, there is advantageously provided at least one orifice (for example the points referenced 59a in FIG. 4) arranged to allow fluid to be compressed flowing in channels 54 to flow in proximity to axial bearing 24, front radial bearing 18 and back radial bearing 22; and at least one orifice (corresponding, for example, to the same points referenced 57b in FIG. 4) arranged to allow the fluid to be compressed to rejoin said channels 54 after cooling said axial bearing 24, front radial bearing 18 and back radial bearing 22.

Thus, after entering the first compression stage through inlet 5, the fluid to be compressed passes into channels 54 through the compressor parts located along the longitudinal axis between the first compression stage and the second compression stage and rejoins the second compression stage. Consequently, when it passes between inner wall 52 and ferrite elements 14b of the motor, the fluid to be compressed cools the motor and recovers the calories lost by the motor to increase its efficiency before entering the second compression stage. Further, orifices 57a, 57b allow a slight deviation of the flow, so that the fluid to be compressed also flows between stator 14 and rotor 16 and in the bearings to cool these elements and recover heat losses in the motor and heat losses caused by friction in the bearings.

Figure 3:
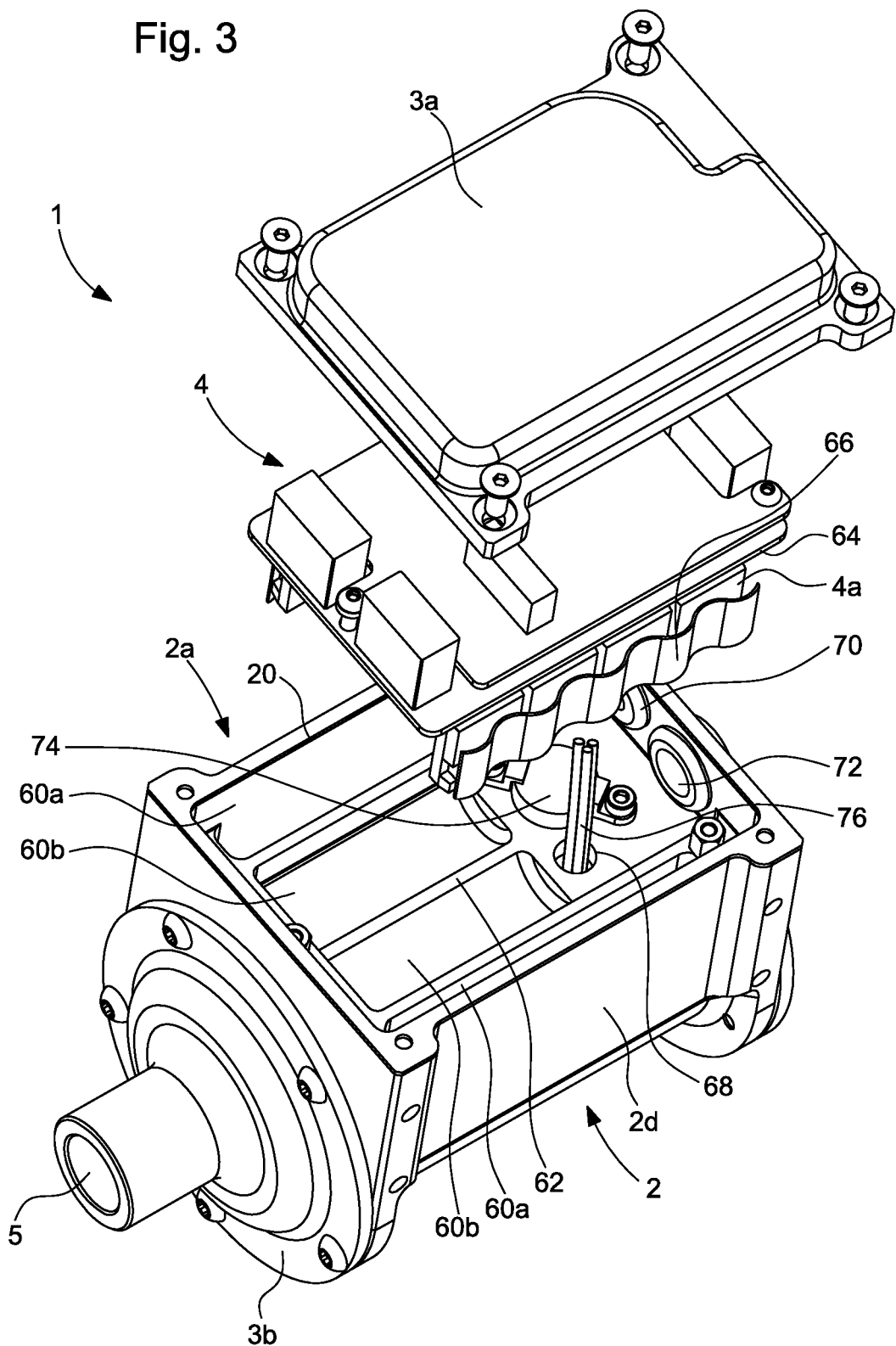
FIG. 3 represents is a partially exploded, perspective view of the compressor of FIG. 1, as seen from above.

Further, with reference to FIGS. 3 and 5, case 2 includes at its surface at least one cavity 60a, 60b forming at least one integrated housing arranged to receive at least one electronic component of the compressor, said integrated housing extending towards inner wall 52, as closely as possible to channels 54, to allow said electronic component to be cooled by the fluid to be compressed flowing in channels 54 by means of inner wall 52, which is itself in contact with the fluid to be compressed flowing in channels 54.

Advantageously, case 2 includes, on a same surface defining its upper inner face 62, several cavities 60a, 60b each forming an integrated housing arranged to receive an electronic component of the compressor, said cavities 60a, 60b being arranged at least above and at least on one side, preferably on each side, of inner wall 52 of inner housing 50 of case 2. Thus, the integrated housings, and therefore the electronic components placed inside these integrated housings, are arranged as closely as possible to the fluid to be compressed that flows inside channels 54 in contact with inner wall 52, such that said fluid to be compressed can recover the heat emitted by said electronic components by means of said inner wall 52.

Preferably, at least one of cavities 60a, 60b extends longitudinally at least partially along flow channels 54 for the fluid to be compressed to form an integrated housing extending longitudinally over at least part of the upper inner face 62 of case 2. Thus, the integrated housings follow channels 54 in order to provide an area of maximum heat exchange between the electronic components disposed inside the integrated housings and the fluid to be compressed, by means of said inner wall 52.

Figure 8:
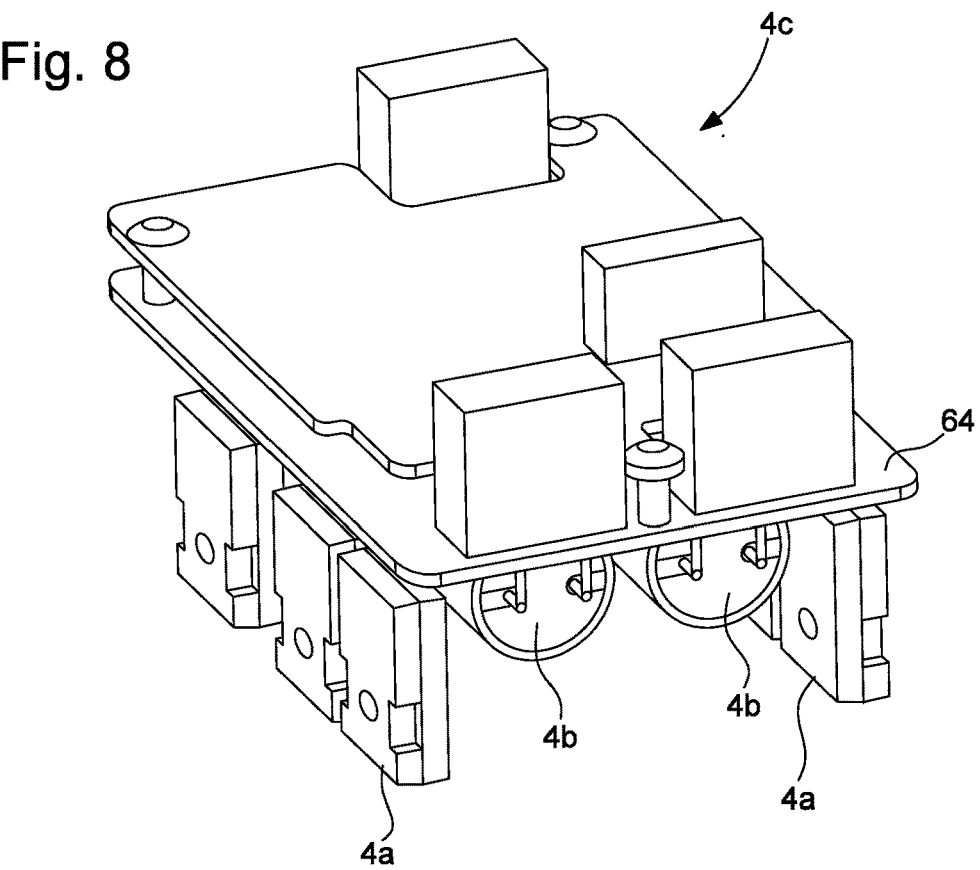
FIG. 8 is a perspective view of the plate bearing the electronic components.

Advantageously, and with reference to FIG. 8, the compressor includes at least one plate 64 arranged to receive electronic compressor components 4, said plate 64 carrying on its lower face at least electronic components 4a, 4b extending longitudinally along longitudinal axis AA, said plate 64 being positioned above upper inner face 62 of case 2, such that said electronic components 4a, 4b extending longitudinally across the lower face of plate 64 are respectively housed inside their integrated housings extending longitudinally at least partially along flow channels 54 for the fluid to be compressed. On the upper face of plate 64 are provided other electronic components 4c, arranged to be housed inside upper cover 3a.

For example, electronic components 4a are transistors which are arranged longitudinally on each side of the plate and vertically to plate 64, so as to have the largest possible contact surface with the case and to be as close as possible to the fluid to be compressed by means of inner wall 52 on each side of motor 12. It is evident that, if there is sufficient place, the transistors can all be disposed on the same single side of the motor.

Further, the integrated housings, and especially the integrated housing which extend longitudinally, at least partially along flow channels 54 for the fluid to be compressed, can comprise a strip spring 66, preferably disposed longitudinally, and arranged to keep electronic component 4a disposed inside said integrated housing resting against the wall of the integrated housing in the direction of inner wall 52.

Electronic components 4b are, for example, tube capacitors of circular cross-section and are arranged longitudinally on the lower face of plate 64 so as to be housed inside cavities 60b at the corresponding rounded bottom provided above motor 12 in order to have the largest possible contact surface with the case and to be as close as possible to the fluid to be compressed by means of inner wall 52 above motor 12. It is possible to arrange heat conductive paste at the bottom of cavity 60b for better contact between the capacitor and case 2.

Thus, the fluid to be compressed which flows in channels 54 also recovers heat losses from the electronic components of the compressor, which are arranged as closely as possible to said fluid to be compressed. Further, the inside of the compressor is optimised, and especially the upper surface of the case is cut to accommodate the electronic components of the compressor in a small volume, which makes it possible to make a very compact compressor.

Advantageously the upper inner face 62 of case 2 has a bore 68 arranged to allow the passage of cables 76 between motor 12 and electronic components 4, said bore being sealed so that there is no leakage of fluid to be compressed. To this end, resin is poured into bore 68 and cable elements are inserted into the resin as it is poured. The other cable elements respectively connected to motor 12 and to electronic components 4 are then welded to the cable elements cast in the resin inside bore 68. Other sealed cable passages 70 and 72 are provided on back face 2c of case 2, for example, for the control cable outlet and for the power cable outlet, which provides a safe connection.

Preferably, the compressor includes a pressure and temperature sensor 74 between the two compression stages, which allows self-regulation of the compressor.

The fluid compressor used in the invention can reach very high rotational speeds, comprised between 100,000 rpm and 500,000 rpm. It allows the fluid compressed in the first compression stage to move substantially through the entire system to recover all lost heat, and particularly heat lost in the motor, bearings and electronic components, in order to increase its efficiency before entering the second compression stage (as the temperature of the fluid to be compressed increases, so does its pressure). Further, using only the fluid to be compressed to cool the compressor, without the aid of an additional cooling circuit, and the arrangement of the electronic components inside the compressor so that the electronics are integrated in the case, make it possible to obtain a very compact compressor. The HVAC system according to the invention including the compressor described above thus has a high rotational speed and a high compression ratio while occupying a small volume, allowing it to be easily housed inside an electric, hybrid or hydrogen vehicle. For example, a compressor used the invention has a compression ratio of more than 3, and a power on the order of 4 kW with the following dimensions: Length×width×height of around 14×8×11 cm for a weight of only 1.5 kg.

Figure 9:
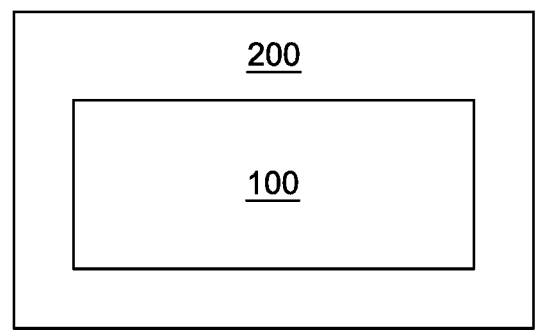
FIG. 9 is a schematic view of a vehicle including the HVAC system.

As shown in FIG. 9, the present invention also concerns electric, hybrid or hydrogen vehicles 200, including an HVAC system 100 as described above.

The invention claimed is:

1. A two-stage, fluid compressor for a heating, ventilation and air conditioning system comprising:
a case having a fluid inlet and a compressed fluid outlet and containing a shaft rotatably mounted about a longitudinal axis, a first compression wheel and a second compression wheel mounted back-to-back on said shaft, said first compression wheel forming a first compression stage and said second compression wheel forming a second compression stage, and a motor positioned between the first compression wheel and the second compression wheel and arranged to rotate the shaft,
wherein the shaft is hollow and contains a threaded rod within the shaft, the threaded rod extends past longitudinal ends of the shaft to be directly attached to the first compression wheel and the second compression wheel,
wherein the case includes a through inner housing extending coaxially to the longitudinal axis and inside which is arranged at least the motor, said inner housing having an inner wall arranged to form, with the motor, channels between at least said inner wall and the motor, said channels extending between the first compression stage and the second compression stage, allowing the motor to be cooled on contact with fluid to be compressed flowing in the channels,
wherein the case includes at its surface at least one cavity forming at least one integrated housing arranged to receive at least one electronic component of the compressor, said integrated housing extending towards the inner wall to allow said electronic component to be cooled by the fluid to be compressed flowing in the channels by means of the inner wall,
wherein the two-stage, fluid compressor is configured to reach rotational speeds between 100,000 and 500,000 revolutions per minute,
wherein the shaft is rotatably mounted on the case with at least a front radial bearing, a back radial bearing and an axial bearing, and
wherein the axial bearing is positioned directly between the first compression wheel and the longitudinal end of the shaft that is closest to the first compression wheel, and the first compression wheel extends through the axial bearing into the shaft.

2. The heating, ventilation and air conditioning system according to claim 1, wherein the inner wall of the inner housing of the case has a circular cross-section and wherein the motor has hollows on its external face, said hollows forming with said inner wall said channels for flow of the fluid to be compressed.

3. The heating, ventilation and air conditioning system according to claim 1, wherein the case comprises, on a same surface defining an upper inner face, several cavities each forming an integrated housing arranged to receive an electronic component of the compressor, said cavities being arranged at least above and at least on one side of the inner wall of the case.

4. The heating, ventilation and air conditioning system according to claim 1, wherein the cavity extends longitudinally.

5. The heating, ventilation and air conditioning system according to claim 4, wherein the fluid compressor comprises at least one plate arranged to receive the at least one electronic component of the compressor, said plate being positioned above an upper inner face of the case, such that said at least one electronic component is housed inside the at least one integrated housing.

6. The heating, ventilation and air conditioning system according to claim 1, wherein the integrated housing includes a strip spring arranged to keep the electronic component disposed inside said integrated housing resting against a wall of the integrated housing in the direction of the inner wall.

7. The heating, ventilation and air conditioning system according claim 1, wherein the fluid compressor comprises an upper cover for closing an upper face of the case, said upper cover being positioned on a side of the at least one electronic component.

8. The heating, ventilation and air conditioning system according to claim 1, wherein the motor comprises a stator and a rotor and wherein there is provided at least one orifice arranged to allow the fluid to be compressed flowing in the channels to enter the motor and to flow between the stator and the rotor and at least one orifice arranged to allow the fluid to be compressed to exit the motor and to rejoin said channels after cooling the motor.

9. The heating, ventilation and air conditioning system according to claim 1, wherein there is provided at least one orifice arranged to allow the fluid to be compressed flowing in the channels to flow in proximity respectively to the front radial bearing, the back radial bearing and the axial bearing, and at least one orifice arranged to allow the fluid to be compressed to rejoin said channels after cooling said front radial bearing, back radial bearing and axial bearing.

10. The heating, ventilation and air conditioning system according to claim 1, wherein the axial bearing is an aerodynamic bearing and wherein on at least one of its faces said bearing has first grooves arranged to create an air film.

11. The heating, ventilation and air conditioning system according to claim 1, wherein the front radial bearing and the back radial bearing are aerodynamic bearings and wherein, facing the front radial bearing and the back radial bearing, the shaft has second grooves arranged to create an air film.

12. The heating, ventilation and air conditioning system according to claim 1, wherein the fluid compressor comprises a front radial bearing bracket and a back radial bearing bracket, arranged to be positioned around the shaft, respectively at the front and at the back of the motor, and wherein the front radial bearing bracket includes at least a first slot positioned facing a second slot provided on the front radial bearing, said first slot and said second slot being arranged to receive a front bearing sealing joint, and wherein said back radial bearing bracket includes at least a third slot positioned facing a fourth slot provided on the back radial bearing, said third slot and said fourth slot being arranged to receive a back bearing sealing joint.

13. The heating, ventilation and air conditioning system according to claim 12, wherein the front radial bearing bracket includes a fifth slot provided for the passage of air and wherein the back radial bearing bracket includes a sixth slot provided for the passage of air.

14. The heating, ventilation and air conditioning system according to claim 1, wherein the case has a bore arranged to allow the passage of cables between the motor and the at least one electronic component, said bore being sealed.

15. A vehicle comprising:
a two-stage, fluid compressor configured to reach rotational speeds between 100,000 and 500,000 revolutions per minute and comprising a case having a fluid inlet and a compressed fluid outlet and containing a shaft rotatably mounted about a longitudinal axis, a first compression wheel and a second compression wheel mounted back-to-back on said shaft, said first compression wheel forming a first compression stage and said second compression wheel forming a second compression stage, and a motor positioned between the first compression wheel and the second compression wheel and arranged to rotate the shaft,
wherein the shaft is hollow and contains a threaded rod within the shaft, the threaded rod extends past longitudinal ends of the shaft to be directly attached to the first compression wheel and the second compression wheel,
wherein the case includes a through inner housing extending coaxially to the longitudinal axis and inside which is arranged at least the motor, said inner housing having an inner wall arranged to form, with the motor, channels between at least said inner wall and the motor, said channels extending between the first compression stage and the second compression stage, allowing the motor to be cooled on contact with fluid to be compressed flowing in the channels,
wherein the case includes at its surface at least one cavity forming at least one integrated housing arranged to receive at least one electronic component of the compressor, said integrated housing extending towards the inner wall to allow said electronic component to be cooled by the fluid to be compressed flowing in the channels,
wherein the shaft is rotatably mounted on the case with at least a front radial bearing, a back radial bearing and an axial bearing, and
wherein the axial bearing is positioned directly between the first compression wheel and the longitudinal end of the shaft that is closest to the first compression wheel, and the first compression wheel extends through the axial bearing into the shaft.

16. The heating, ventilation and air conditioning system according to claim 1, wherein the threaded rod is screwed to the first compression wheel and the second compression wheel.

* * * * *